United States Patent
Eidson et al.

[19]

[11] Patent Number: 6,167,457
[45] Date of Patent: *Dec. 26, 2000

[54] MESSAGE FILTERS, AUTOMATIC BINDING, AND ENCODING FOR DISTRIBUTED SYSTEMS

[75] Inventors: John C Eidson, Palo Alto, Calif.; Clark Nicholson, Seattle, Wash.; Gerald Weibel, Everett, Wash.; Dennis O'Brien, Marysville, Wash.; Jay M Wardle, Seattle, Wash.; Glenn R. Engel, Lake Stevens, Wash.; Ronald van der Meulen, Mukilteo, Wash.

[73] Assignee: Agilent Technologies, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/763,589

[22] Filed: Dec. 11, 1996

[51] Int. Cl.[7] .......................................................... G06F 9/00
[52] U.S. Cl. .............................................................. 709/328
[58] Field of Search ..................................... 395/680, 684, 395/500, 200.75, 200.5; 380/49; 709/300, 304, 220, 245, 310, 330, 328; 702/188

[56] References Cited

U.S. PATENT DOCUMENTS

| | | | |
|---|---|---|---|
| 4,870,571 | 9/1989 | Frink | 364/200 |
| 5,175,854 | 12/1992 | Cheung et al. | 395/650 |
| 5,187,787 | 2/1993 | Skeen et al. | |
| 5,280,477 | 1/1994 | Trapp | 370/85.1 |
| 5,434,978 | 7/1995 | Dockter et al. | 395/200 |
| 5,487,023 | 1/1996 | Seckora | 364/724.13 |
| 5,490,276 | 2/1996 | Doli, Jr. et al. | 395/700 |
| 5,519,780 | 5/1996 | Woo et al. | 380/49 |
| 5,524,253 | 6/1996 | Pham et al. | 395/800 |
| 5,579,482 | 11/1996 | Einkauf et al. | 395/200.1 |
| 5,586,305 | 12/1996 | Eidson et al. | 395/500 |
| 5,822,527 | 10/1998 | Post | 395/200.36 |
| 5,867,651 | 1/1999 | Dan et al. | 395/200.33 |
| 5,978,753 | 11/1999 | Eidson | 702/188 |

OTHER PUBLICATIONS

Autonomous Decentralized Systems: Concept, Data Field Architecture and Future Trends, by Kinji Mori, 1993 IEEE, pp. 28–34.

*Primary Examiner*—Majid A. Banankhah
*Assistant Examiner*—Sue Lao
*Attorney, Agent, or Firm*—Pamela Lau Kee

[57] ABSTRACT

A method for establishing bindings in distributed systems is based on a relational characterization interface (RCI) that includes the following fields: ensemble, message type, and variable name. Optional fields may be specified such as time stamp, units, location, and value. The RCI uses explicit representation and standard representations for data and other communication entities to minimize the difficulty in establishing the necessary communication between parts of these systems while maximizing the interoperability properties of the components of these systems. In addition, the interface allows for the use of distributed or collective entities. A variety of services and other supporting methods are enabled by the RCI.

15 Claims, 3 Drawing Sheets

28 {ensemble, message_type, variable_name, [time_stamp].[units].[location].[value]....}

*Figure 3*

MESSAGE FILTERS, AUTOMATIC BINDING, AND ENCODING FOR DISTRIBUTED SYSTEMS

FIELD OF THE INVENTION

The invention is directed towards distributed systems used in the area of measurement and control. In particular, the invention pertains to message filtering, automatic binding and encoding of fields, and other items related to the construction and commissioning of distributed systems.

BACKGROUND

Many measurement and control applications use a central controller in conjunction with a number of remotely located transducers: sensors or actuators. These transducers are connected to the central controller via a point to point link. Recently, a number of 'field-busses' have emerged that allow several of these devices to share a packet-based bus for communication to the central controller but also permit distributed operation with peer-to-peer communication. Busses require addressing schemes to establish the communication patterns over this shared media. These addressing schemes are often implemented by assigning identifiers called 'tags' to each addressable entity in each node or computing entity in the system. The communication patterns among such entities are established by associating or "binding" the various tags defining the elements in each pattern.

One example of tag-based binding, disclosed by Skeen, et al., in U.S. Pat. No. 5,187,787 issued Jul. 27 1989, is a publisher-subscriber based system using "subject-based" addressing. Subjects are defined as a tags having a parsable hierarchical structure. To illustrate, the tag 'SFB.P39.temp' represents the 'temperature at Pier 39 on San Francisco Bay'. If this temperature is displayed on an annunciator with a tag of 'display_7.row 2', then these two tags would be used "bound" according to a defined procedure. These tag fields are in string format.

Management of the tag name-space increases with the complexity of the communication patterns. As a result, the tags must be overloaded to express several kinds of information in a single structure. The binding of the overloaded tags restricts computability. The binding "temperature at Pier 39 on San Francisco Bay" combines three pieces of data: the temperature is being reported and the measurement was made at Pier 39 which is located on San Francisco Bay. If the system involves a large variety of measurements of the San Francisco Bay environment such as salinity, pH, etc. and numerous locations in addition to Pier 39, then the resulting tag name-space would be quite large.

Another problem is the units and storage type of the values referenced by the tags are implicitly bound. At one site, the temperature may be reported as an integer in degrees Fahrenheit while for another location, the value may be a real number in degrees Centigrade. When the bindings are established, care must be taken to insure that only like units and storage types are bound or that suitable conversion operations are provided. A more explicit definition of the representations is needed.

The overloaded tags are ill-suited for systems where computations must be made on the data from several sources. Often spatial data in a non-computable form is overloaded into the tag along with what is being measured. If the system needs to compute the temperature gradient along the waterfront in the vicinity of Pier 39, it is difficult to establish the necessary bindings and to extract the necessary spatial data.

Tag-based systems may impede the development of application code and bindings for managing data according to dynamically changing requirements. Introducing new spatial locations involves establishing names which do not conflict with existing tags and then revisiting the binding process. The problem resides both in the static and inappropriate representation of spatial data and in the static nature of the bindings. Similarly, it is difficult to dynamically change the bindings to receive different data, e.g. to receive temperature measurements from all locations within a changing range of locations.

The tag-based architecture does not lend itself to the problem of creating truly distributed computational and communication entities. Collective entities behave as a single program executing in a single component, a normal or compact entity or application, but are in fact a collection of program fragments which execute on several components and collectively appear as one. It is usually not possible to state which of the fragments in the collective will be involved for any specific binding at a specific time. These entities are a poor match to these tag-based systems.

What is needed is a flexible, yet compact, nomenclature and method to allow bindings to be established in distributed systems of normal and collective entities. It is further desirable that such a nomenclature and method have a dynamic nature and allow for a rich and computable expression of the semantics of the application.

SUMMARY OF THE INVENTION

This invention defines a method for establishing bindings in distributed systems based on a relational characterization interface (RCI). The RCI typically includes the following fields: ensemble, message_type, and variable name. Optional fields may be specified such as time stamp, units, location, storage type, and value. The fields may be extended to include user defined fields or fields that depend on system characteristics or 'environment' variables. RCI allows for two methods to establish bindings: content based filtering and attribute based addressing.

The ensemble field defines sets of computational entities according to application specific criteria, e.g. all computational entities which analyze temperature. The message_type, field defines the application semantic model for the data, i.e. "measurement or actuation data", "setpoint data", "events", "administrative".

In content based filtering, the bindings are established by using the RCI to define logical constraints. Providers of data populate the relevant fields of the RCI with values characterizing the provided data. Receivers of data specify a filter pattern that when applied to the RCI by the communication system will admit only those sets which meet the match characteristics. Providers and receivers may dynamically modify, respectively, the characterizers and filters of the RCI. This model allows providers to post the data with the descriptive RCI without the knowledge of the potential receivers or their specific interest in this data. Receivers are free to specify their own interest in the universe of available data by specifying a filter which will be applied to the RCI of the data, regardless of the identity of the provider. To illustrate, a provider could post data containing the RCI fields {ensemble=2, variable-name='voltage'} with a payload value=7 and units='volts'. This would be selected and acted upon by a receiver with a filter of {ensemble=2, variable-name=*(anything)} and by a receiver with a filter of {ensemble=2, variable-name='voltage'} but not by a receiver with a filter of {ensemble=3, variable-name=*}.

In attribute based addressing model, the providers of data specify a filter pattern based on an RCI which is descriptive of data characterizing receivers. This filter is attached to the data posted by the provider. All potential receivers apply the attached filter to the RCI which describes receivers and if a match is made the receiver will accept the data and act on it. This model allows providers to target the data at targets based on characteristics of the targets defined by the RCI fields. The fields of the filter and RCI may optionally include the primary data content of the posting, that is the data, commands, etc. In addition, the fields of the filter and the RCI may be dynamically changed. The provider may or may not know if there are any such receivers but is none the less able to specify this restriction. To illustrate, by the appropriate filter, a provider might post data containing update parameters, the payload, which is to be acted upon by all entities where the filter-RCI combination extracts for 'Firmware revision 2.3'.

The fields in the RCI are preferably based on standard data representations such that each field has a well defined semantic meaning. These standards may include common nomenclature and user extension definitions for fields based on their use in measurement and control applications. For example, the default variable name for data concerned with temperature would be standardized as 'temperature' and the field instantiated using an enumeration or string. Standards minimize the difficulty in establishing the necessary bindings while maximizing the interoperability properties of the components of these systems.

The RCI can be applied to collective as well as single entities. A collection of sensors and actuators that form a control system can itself be regarded as an entity with its own RCI. Different characterizations of the RCI for this collective actually reside in different elements of the collective yet the total RCI appears to the external world as a single entity.

BRIEF DESCRIPTION OF THE DRAWINGS

FIG. 3 illustrates a relational characterization interface.

DETAILED DESCRIPTION OF THE PREFERRED EMBODIMENTS

Figure 1:
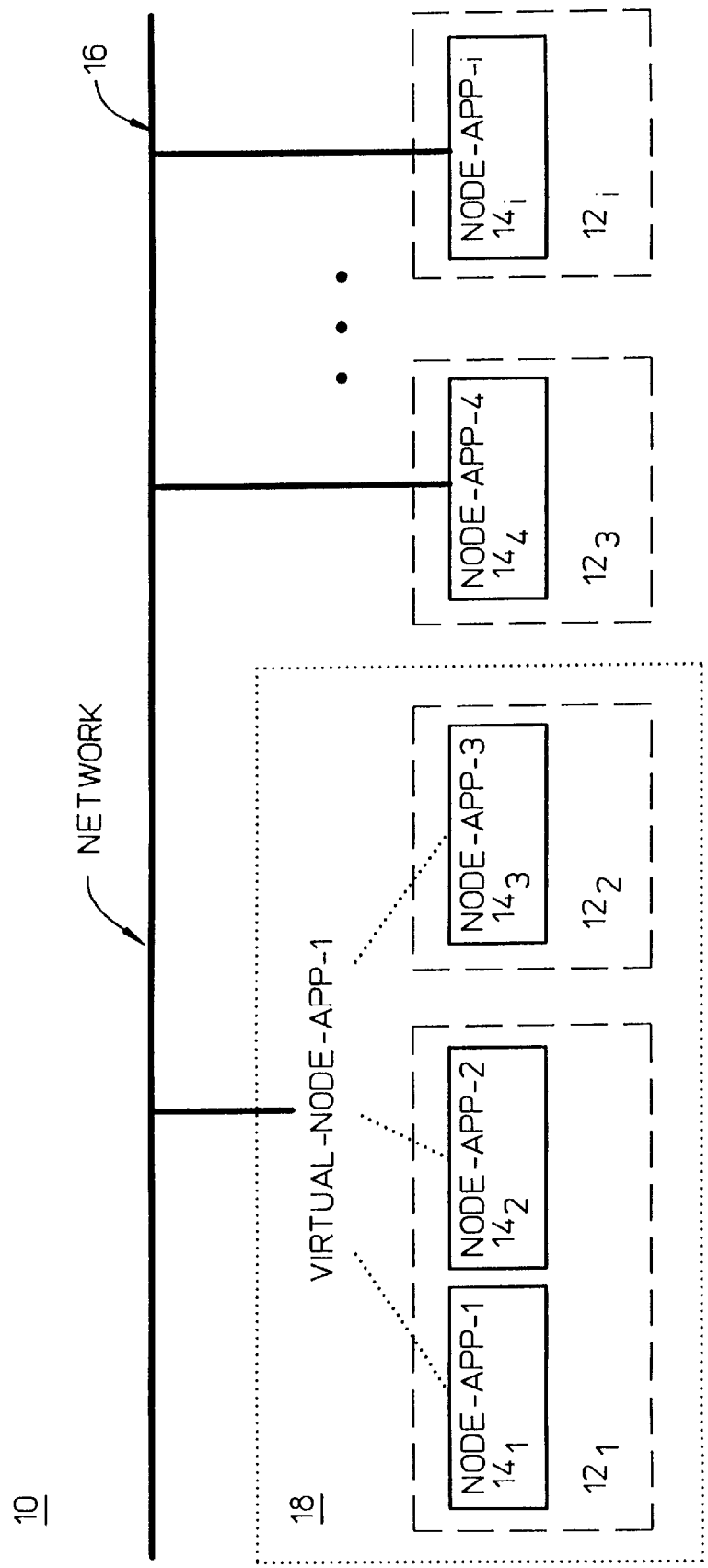
FIG. 1 illustrates a block diagram of a system constructed using the present invention.

FIG. 1 illustrates a distributed measurement and control system 10 according to the present invention. The system 10 consists of several computing elements $12_1$, $12_2$, $12_3$, . . . , $12_N$, e.g. microprocessors. Many of these computing elements have associated transducers (not shown), i.e. sensors or actuators, to interact with the physical world. Each computing element contains at least one fragment of application specific code or node application $14_1$, $14_2$, $14_3$, $14_4$, . . . $14_i$ that executes on the corresponding computing element. While node applications may have one-to-one correspondence with a processor, several may share a processor or a single node application may use multiple processors. Each node application may represent a one or more well-defined applications. All of the node applications $14_1$, $14_2$, $14_3$, $14_4$, . . . $14_i$ post and receive data to a network 16.

A virtual-node application 18 is an aggregate of node applications that may or may not be resident on a common processor. This aggregate, in combination, forms a complete computational task. Alone, each node application in the virtual-node application may be incomplete without the other node applications in the collection.

The node applications and virtual-node applications communicate with each other over a network. For virtual-node applications, the actual communications will be associated with one or more of the constituent node applications. However the bindings within or involving the virtual-node application need not be static.

Each item of data shared among the node applications has an associated RCI. The node application characterizes the RCI. This characterization may be done by an external tool optionally over the network to associate an RCI characterization with a particular item within the node application. Characterizations may also be assigned by an 'installation' or other portions of an node application that base the characterization on other data available to the node application, e.g. measurement values or operating parameters of associated sensors or actuators.

For content-based filtering, the provider node applications provide data and the required characterization for the RCI prior to initiating the posting of this data to the network. Similarly the receiver node applications receive data and provide the filter specification to be applied to the RCI associated with the incoming data. Based on this filter, the appropriate data is extracted from the network and passed to the receiver.

In attribute-based addressing, the providers additionally provide the required characterization for the attached filter prior to initiating the posting of this data to the network. Similarly, the receivers provide the required RCI specification to which the filter is to be applied to select the appropriate data to be extracted from the network and passed to the consuming node application.

Figure 2:
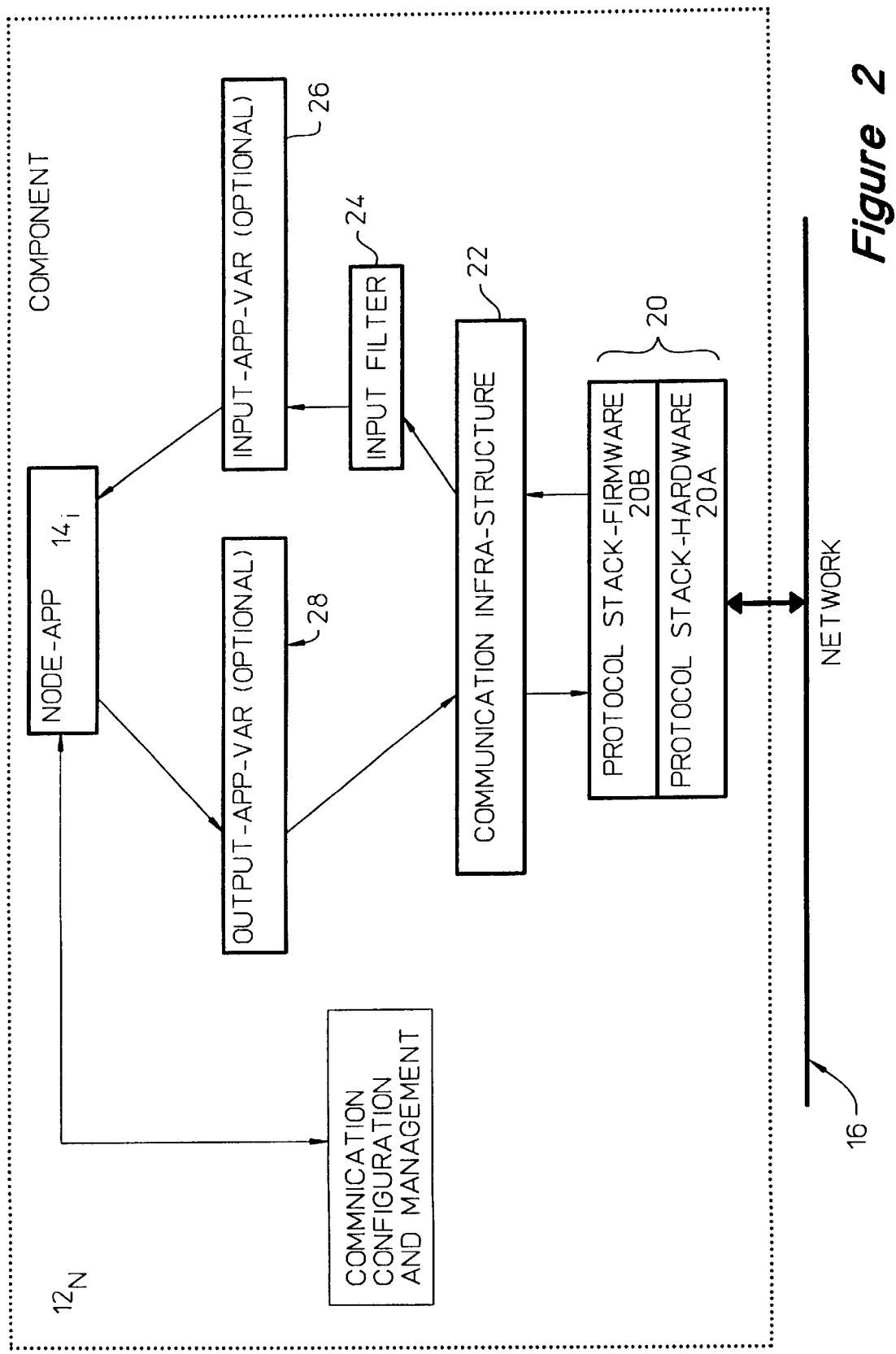
FIG. 2 illustrates preferred embodiment within a component which are useful in supporting this invention.

FIG. 2 illustrates the next level of detail of a typical system component $12_N$, The interface to the network is via a protocol stack 20, typically part of the operating system or environment in which the node application $14_i$ executes. Typical protocol stacks have a part implemented in firmware 20B and a part implemented in hardware 20A for greater communication and computational efficiency.

The communication infra-structure 22, interacts with the network protocol stack 20, is support code that augments the protocol stack to provide a variety of possible services. This structure may provide a CORBA or an OLE interface or map the desired communication model onto the model required in a particular installation, e.g. mapping onto a multi-master model such as SP-50 or a publisher-subscriber model such as used by TIBCO. In addition, this structure coordinates the posting and filtering model used by the providers and receivers with the protocol stack. This includes mapping of filters onto the protocol stack and the filter structure and possibly implementing adaptive changes in filter order to maximize performance. This structure supports other services described later. The Communication configuration and management structure manages and configures the other structures defined and provides typical interfaces to both node applications and external tools to accomplish these functions.

An Input-filter 24 applies the extraction characterization specified by the RCI-filter combination to inbound data. Only data meeting criteria is passed to the Input-app-var structure.

In a preferred embodiment, part of the filtering for each RCI is assigned first to the hardware portion of the protocol stack 20A and then to the firmware portion 20B. The amount of filtering which may be so assigned depends on the particular protocol stack used. For example, Ethernet implementations usually allow a single filter to be implemented in hardware. The details of this mapping of RCI fields to the protocol stack 20, and the Input filter 24 is discussed later. The assignment is not static but may be dynamically changed by the node application $14_i$ or may be implemented such that the filtering is done adaptively to maximize performance.

The Input-app-var 26, typically receiving data from the input filter 24, is an optional data structure based on a system wide data model for data transfer between node applications $14_i$. Many of the fields of the RCI will be included in this data model and the values assigned by the generator of the received data will appear in the fields of the Input-app-var. "App-vars" allows additional supporting structure to be constructed that may be used by the node application $14_i$, e.g. code for computation on a time-stamp field of the app-var, automatic assignment or storage of app-var fields to node application $14_i$ defined entities, etc. App-vars may be constructed for specific storage types for the values fields of the data with the support code automatically assigning incoming data to the correct storage type based on RCI fields or on the message type if a typed data model is used. In addition, App-vars can automatically encode and decode fields between representations visible to the node applications $14_i$ and those used by the network visible representations. The Input-app-var 26 can then be accessed, and may trigger action in the associated node application $14_i$.

Outbound data is passed from the node application $14_i$ to an optional Output-app-var 28, and then to the communication infra-structure 22. Like Input-app-vars, Output-app-var 28 support code can be automatically instantiate some of the fields if so configured by the node application $14_i$, e.g. the automatic generation of time-stamps. The node application $14_i$ is also responsible for specifying the fields of the RCI or filter (depending on communication model selected) associated with the data. The Output-app-var data is then transferred to the protocol stack 20 via the communication infrastructure block 22. This app-var functionality could be implemented in each node application $14_i$ in which case the transfer would be directly to the communications infra-structure 22.

FIG. 3 illustrates an embodiment for the RCI of the present invention. This interface is used as the basis for establishing communication between the node applications or virtual-node applications shown in FIG. 1 using the detailed mechanisms illustrated in FIG. 2. The fields are ensemble, message_type, and variable_name. The optional fields include but are not limited to time-stamp, units, location, and value.

In particular, optional fields that reflect semantics and values which characterize the system or the environment as opposed to characterizing application specific data are admitted. For example, an RCI may include a field representing the local time zone, the 'department or persons' owning the node, the revision date of the components, serial numbers, the time of day, the amount of data locally logged, etc.

All packets posted to the network by any node application or virtual-node application contain an application header and a payload record. This embodiment does not specify how the RCI, for the content based filter model, or the filter, for the attribute based addressing model, are apportioned between the header and the payload records. This is an implementation dependent matter which should be designed for efficiency.

The ensemble field defines an entity of node applications and virtual-node applications which are cooperating to carry out some larger task. The membership in the entity is established according to the needs of the application, and may be based on criteria such as a common subject, a common function, or a common attribute. As an illustration, the ensemble field may be defined as an entity of node applications associated with a particular residence address, where the ensemble field may be the UUID of a component that exists as a unique entity in each residence, such as the electric meter. The Communication infra-structure maps this representation of the ensemble onto the address structure of the underlying communication protocol. Alternatively, membership in an ensemble may be a computed function of one or more fields and may change with time since this system allows local modification of filtering. For example, an ensemble might consist of all node applications currently measuring temperatures in a certain range. In this case, the membership in the ensemble is computed dynamically.

The message_type field classifies the data in terms of application defined functional semantics of the packet. As an illustration, the data packets may be classified as containing measurement data, as describing some event, or as pertaining to some global protocol such as time-synchronization, or containing commands.

The variable name field describes the name of the item contained in the data packet. The variable name may be depend upon the message type field e.g. a time synchronization protocol will typically have several distinct packets carrying different data differentiated by this attribute. Event packets use this attribute as a token designating the kind of event. Data packets use this name to designate the physical quantity measured such as voltage, etc. The preferred embodiment of the variable name field defines defaults and rules for representation for each message type. For data packets, the maximum interoperability and usefulness of the RCI may be obtained when the default variable names correspond to the SI designated name for the physical quantity being measured.

The time-stamp field indicates the time measured by a clock local to the component generating the packet. The assignment of time differs with message_type. For data packets the Time-stamp would represent the local time at which the data was measured. For an event, it would represent the time at which the event occurred, etc. If this attribute is missing then the time must be interpreted in a system-wide defined manner such as now.

The units field indicate the units in which the value field, if present, is represented. Interoperability is enhanced when a standard unit representation, such as SI, is used throughout the system.

The location field may represent the spatial position relevant to the value, i.e. the position at which the data was measured. A variety of representations could be used. For a given application, generally one representation promotes computability, e.g. geographic coordinates are appropriate for environmental data.

The value field indicates a value according to the contents of the message_type field, for example in a data packet the value is the measured value in the units designated. Alternatively while the values may be interpreted as data, they may also be interpreted as a command or request. The semantics of interpretation will be indicated by the message_type field.

The storage type field indicates the storage type in which the value field is represented such as float or integer. If the storage type field is not explicit in the data packet, the data packets may be implicitly typed according to storage type by defining "typed app-vars".

In a preferred embodiment, all of the fields have well defined data models that specify the semantics of the field, the representation, default values and rules for non-default cases. When possible, these data models adhere to international standards, e.g. the variable name field uses the SI designated name as a default for the physical quantity being measured. Similarly, SI units would represent the units field. Time adheres to a standard such as UTC. If no standard exists, then a system wide data model with the remaining fields defined appropriately is used. Using well defined data models enhances the interoperability of the resulting components and maximizes the utility of the RCI. Because of the richness of the RCI, the default logical expressions may be sufficient to establish the majority of the binding specification.

All of these RCI fields represent the application header and user space portion of the packets posted by a node application or virtual-node application to the network. To establish communication, a subset of these fields are used to define the bindings or mappings. This is done by having all packets posted preferably but not necessarily using a multicast protocol and having the acceptance of a packet by a node application or virtual-node application in a component be based on the logical restrictions specified by the use of one or more of these fields to form the input filter. The "poster-filter" paradigm has a node application that posts a data packet and has another node application that filters a subset of the data packets.

In a preferred embodiment, a filter field is assigned to the hardware filter of the communication protocol with the remaining filter fields assigned to higher levels of the protocol stack or the input filter of FIG. 2, e.g. Ethernet supports multicast communication and most Ethernet chip sets provide for one level of hardware filtering. Because the ensemble field defines groups of cooperating node applications, it is preferably mapped or assigned to the lowest level of the stack, preferably to the hardware filter. This will generally result in the most efficient first filter. The actual representation or mapping of the ensemble field will depend on the address structure of the network protocol. A variety of methods such as hashing may be used to accomplish this mapping.

In a preferred embodiment, the ensemble field has a well defined data model and representation, in particular, a hierarchical structure. The top level of the ensemble hierarchy includes default names to describe relationships e.g. 'peer' or 'sibling', 'parent', and 'child'. These relationships indicate that the ensemble includes only logical 'siblings' of the node application or only the node application and its 'parents', etc. In addition, user-defined group names can be used. A structured ensemble name-space allows system components, e.g. routers, to use this information.

The extraction of data to be accepted is filter order independent. This allows the communication infra-structure and the communication configuration and management blocks of FIG. 2 to be implemented in such a way as to provide filters which adapt the order of filtering to produce the most efficient filter (in terms of computing cycles) based on the recent mix of data on the network.

In a preferred embodiment, the providers automatically post their data as specified and receivers filter the data available from the network to extract the items of interest.

In another embodiment, the providers post their data only when an application or system defined condition is met. Data not posted may be logged locally or discarded according to the design of the node application which decision may also be made based on application or system defined conditions. These conditions are preferably represented as a logical specification based on properties defined by the system or by the node applications, e.g. a system defined condition would be a membership condition such as 'post if there are at least one each of an enumerated class of node applications'. An example of a node application defined condition would be 'post if the value from a sensor is in a defined range'. This conditional style of posting is referred to as 'post on condition'. When the condition reflects the presence of specific need for the data as evidenced by the existence of RCI filter patterns matching the source, it is called 'post on demand'. This latter form may be implemented using the consumer data service described later.

The communication infra-structure block of a preferred embodiment also implements a collection of services which are made possible by the RCI and the producer-consumer, or post-filter model employed by this invention. These services are optional but will be useful for some kinds of systems and particularly for implementing tools to aid in system administration and configuration. Services may be invoked by node applications, externally over the network in a normal client server model, or may be invoked using the RCI model depending on the implementation. This latter model is particularly useful in large systems in that it provides a mechanism for the invocation of services of a group of node applications treated as a collection defined by the RCI rather than as individual invocations on each member. Likewise services may themselves be providers of data to be posted using the same mechanisms used by node applications.

A preferred set of these services is described in the following:

A provider data service maintains a list of the currently available data based on the RCI of the data. A provider registers with this service to advertise the existence of the data. This service could be queried to verify the existence of data with a certain characterization, potentially the sources, etc. Similarly, this service could automatically post updates to the collection of available services. This service need not be centralized but could itself appear as a collection of distributed special purpose node applications.

A receiver data service maintains a list of the RCI filter patterns currently active in the system. A receiver registers with this service to advertise the need for specific data. The service may be queried to verify the existence of requests for data with a certain characterization, potentially the requesters, etc. Likewise this service can post updates to the collection. This service need not be centralized but may itself appear as a collection of distributed special purpose node applications.

A mapping service allows the mapping of the values of RCI fields from one representation to another. This allows node applications to be written with RCI fields values defined generically. These values may be renamed according to an application meaningful name. Preferably, the new mapping are operable in the filters and visible over the network, e.g. renaming ensembles used in a collection of node applications.

What is claimed is:

1. A distributed measurement and control system that establishes data bindings using a relational characterization interface (RCI), comprising:

first component that posts a set of data to a communication network in a packet that includes a set of fields according to the RCI including an ensemble field for specifying a grouping of computational entities in the system and a message_type field for specifying a measurement and control function in the system and a variable name field for specifying a type of units wherein any one or more of the fields may contain a wildcard indicator;

second component having means for receiving the packet via the communication network and means for applying a filter to the fields contained in the packet wherein the filter includes a set of filter fields according to the RCI including a filter ensemble field for specifying a grouping of computational entities and a filter message_type field for specifying a measurement and control function and a filter variable name field for specifying a type of units wherein any one or more of the filter fields may contain the wildcard indicator such that the data is accepted if the ensemble and message_type and variable name fields that do not contain the wildcard indicator match the corresponding filter ensemble and filter message_type and filter variable name fields that do not contain the wildcard indicator and not otherwise.

2. The distributed measurement and control system of claim 1 wherein the grouping of computational entities comprises a set of node applications that analyze temperature.

3. The distributed measurement and control system of claim 1, wherein the grouping of computational entities comprises a set of node applications that are currently measuring temperature in a particular range.

4. The distributed measurement and control system of claim 1, wherein the grouping of computational entities comprises a set of node applications associated with a particular residence address.

5. The distributed measurement and control system of claim 1, wherein the measurement and control function comprises a communication of a set of measurement data.

6. The distributed measurement and control system of claim 1, wherein the measurement and control function comprises a communication of a set of actuation data.

7. The distributed measurement and control system of claim 1, wherein the measurement and control function comprises a description of an event in the system.

8. The distributed measurement and control system of claim 1, wherein the measurement and control function comprises a time synchronization function.

9. The distributed measurement and control system of claim 1, wherein the measurement and control function comprises a command function.

10. The distributed measurement and control system of claim 1, wherein the fields in the packet describe the data and the filter fields characterize data which is to be accepted by the second component.

11. The distributed measurement and control system of claim 1, wherein the fields in the packet describe components which are to receive the data and the filter fields characterize the second component.

12. The distributed measurement and control system of claim 1, wherein the RCI includes at least one optional field selected from a group that includes time stamp, units, location, value, value storage type, system variables, local environment variables, application environment variables, and user-defined variables such that any one or more of the optional fields may have the wildcard indicator.

13. The distributed measurement and control system of claim 1, wherein the means for applying the filter includes a network protocol stack connected to the communication network, being operative to selectively receive the data according to the fields in the packet and the filter fields.

14. The distributed measurement and control system of claim 13, wherein the network protocol stack includes a hardware portion that applies the filter ensemble field to the ensemble field of the packet.

15. The distributed measurement and control system of claim 14, wherein the hardware portion of the network protocol stack contains a multicast address associated with the grouping.

* * * * *